United States Patent
Weng

[19]

[11] Patent Number: 5,938,216
[45] Date of Patent: Aug. 17, 1999

[54] BABY CARRIAGE WITH SOUND AND AN ILLUMINATION SYSTEM

[75] Inventor: Mao-Hsiung Weng, Tainan, Taiwan

[73] Assignee: Lu Kuang Inc., Tainan, Taiwan

[21] Appl. No.: 09/129,632

[22] Filed: Aug. 5, 1998

[51] Int. Cl.$^6$ ...................................................... B62B 7/00
[52] U.S. Cl. ...................... 280/47.38; 280/647; 280/650; 280/87.01; 340/692
[58] Field of Search ......................... 280/33.992, 33.994, 280/642, 647, 650, 87.01, 87.042, 79.2, 87.051, 47.38, 304.1; 362/286; 340/692, 672

[56] References Cited

U.S. PATENT DOCUMENTS

| | | | |
|---|---|---|---|
| 4,577,880 | 3/1986 | Bianco | 280/33.99 |
| 4,629,950 | 12/1986 | Ching | 318/285 |
| 4,776,415 | 10/1988 | Brice | 280/87.051 |
| 5,342,072 | 8/1994 | Prasad | 280/87.051 |
| 5,646,601 | 7/1997 | Wallace et al. | 340/692 |

*Primary Examiner*—J. J. Swann
*Assistant Examiner*—Lynda Jasmin
*Attorney, Agent, or Firm*—Rosenberg, Klein & Bilker

[57] ABSTRACT

A baby carriage with an illumination sound system comprises a control box having a control circuit, a frame with wheels, a magnet and a magnetic switch mounted on a rear leg of the frame. The magnetic switch is connected to the control circuit, and the control circuit outputs a signal to drive a speaker, an illuminating device, a signal transmitting device, respectively or a combination signal of all the above, thus, when pushing the carriage the above devices can be activated.

4 Claims, 3 Drawing Sheets

BABY CARRIAGE WITH SOUND AND AN ILLUMINATION SYSTEM

BACKGROUND OF THE INVENTION

1. Field of the Invention

This invention relates to a baby carriage with sound and an illumination system and more particularly to a baby carriage utilizing a magnet switch to drive a circuit to output sound or an illumination system for attracting children's attention.

2. Background of the Invention

Baby carriages have been invented for a long time for the convenient of children's guardian when travelling outside, however, in many occasions that babies are tired of seating in the carriage because of boring.

This inventor has therefore invented the current invention to provide a baby carriage having a control box, a control circuit, a frame and a magnetic switch outputs a signal to drive a speaker or an illuminating device or the both for attracting babies seating in the carriage.

OBJECT & SUMMARY OF THE INVENTION

It is the primary object of the present invention to provide a baby carriage with sound and an illumination system which has a sound and vision effects to attract babies' attention.

It is another object of the present invention to provide a baby carriage with sound and an illumination system which is easy to operate and inexpensive.

A baby carriage with an illumination sound system comprises a control box having a control circuit, a frame with wheels, a magnet and a magnetic switch mounted on a rear leg of the frame. The magnetic switch is connected to the control circuit, and the control circuit outputs a signal to drive a speaker, an illuminating device, a signal transmitting device, respectively or a combination signal of all the above, thus, when pushing the carriage the above devices can be activated.

DETAILED DESCRIPTION OF THE PREFERRED EMBODIMENT

Figure 1:
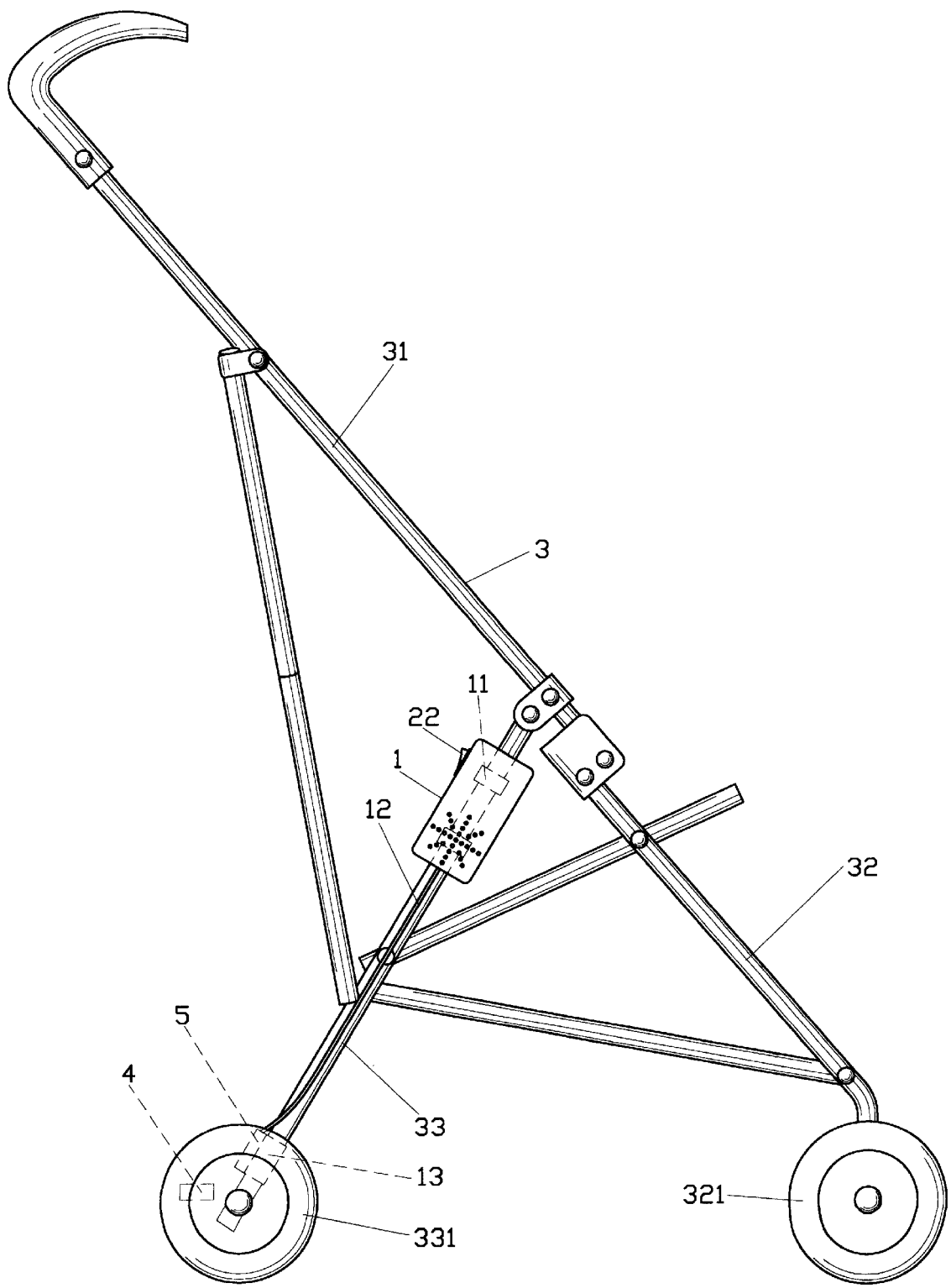
FIG. 1 is a side view of a baby carriage incorporating with a sound and an illumination system of the present invention.
Figure 2:
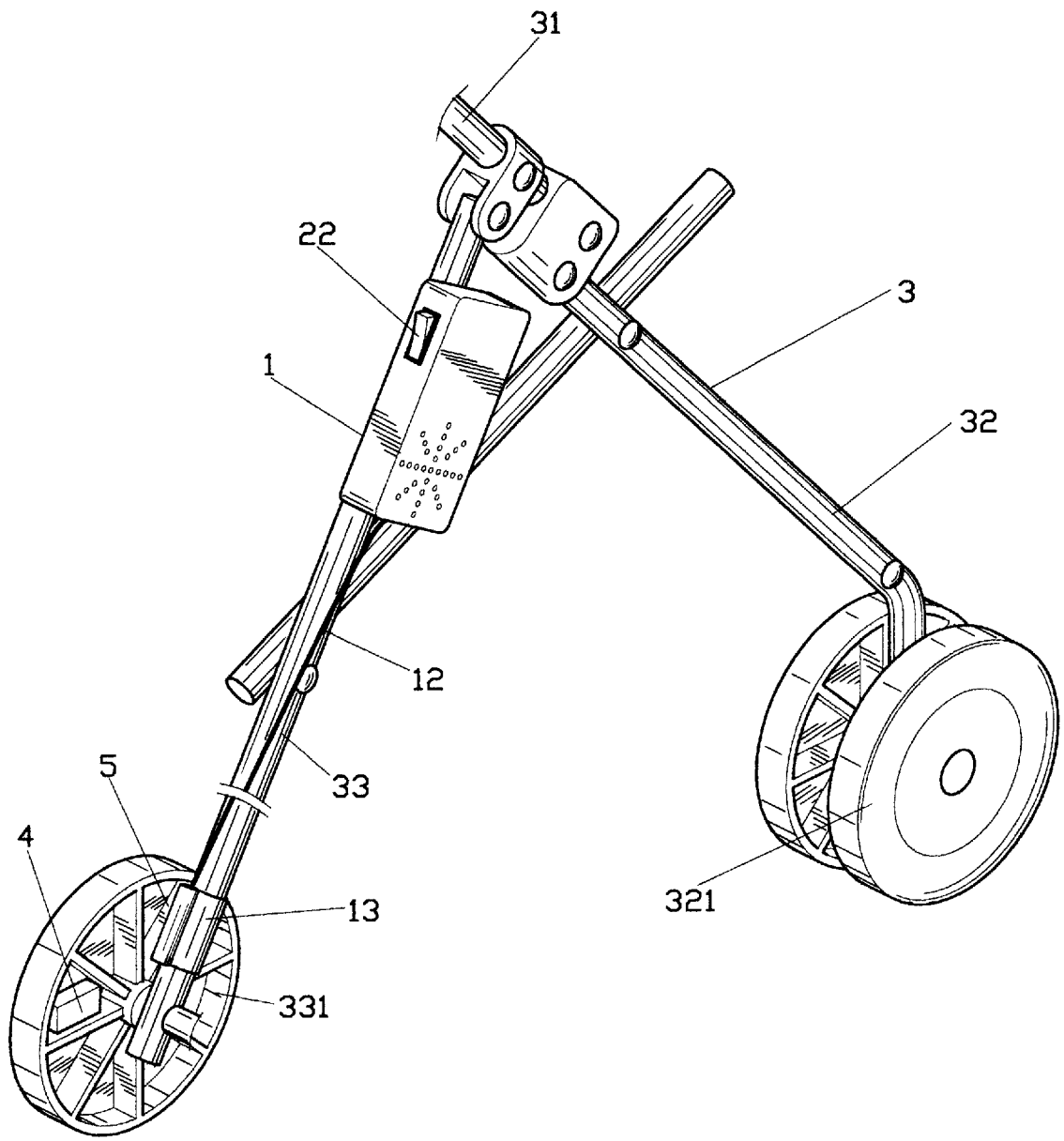
FIG. 2 is an enlarged view of a control box mounted on the rear leg of the baby carriage, according to the FIG. 1.
Figure 3:
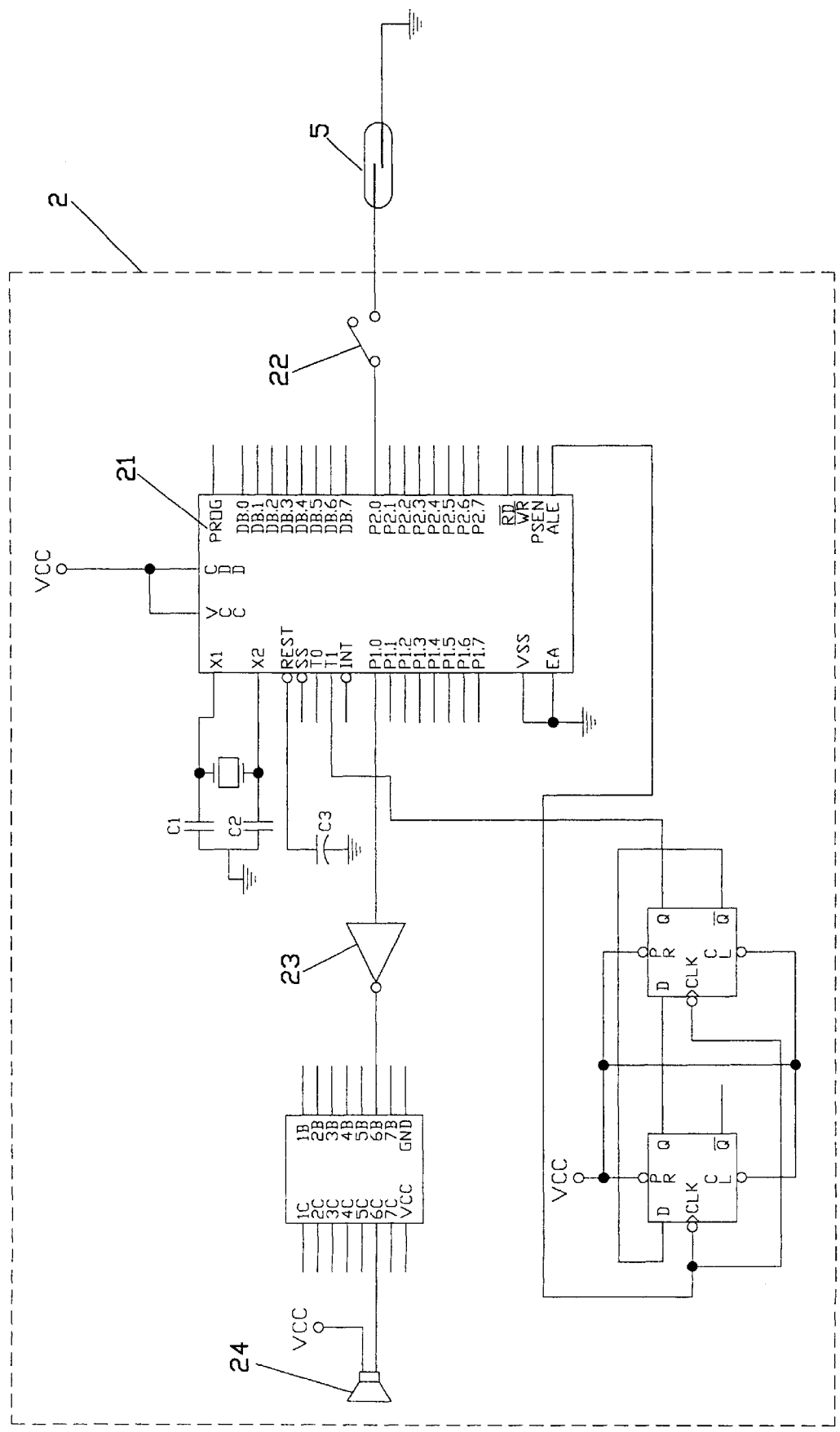
FIG. 3 is an electronic schematic diagram of the control circuit of the present invention.

A baby carriage of the present invention, as shown in FIG. 1, is generally composed of a control box 1 having a control circuit 2 is mounted on a frame 3 of the baby carriage, a magnet 4 and a magnetic switch 5.

The control box 1 includes a pin 11 at one side which is referred to as the rear side, and having an extension wire 12 connected through a coupling pipe 13 to the magnetic switch 5 and the control circuit 2.

The control circuit 2 includes an IC 21 connected to a main switch 22 and the magnetic switch 5 at its input terminal and to an inverter 23 and a speaker 24 at its output terminal. The main switch 22 is mounted on the control box 1.

The frame 3 includes a push rod 31 connected with a front leg 32 and a rear leg 33, the end of the front and rear legs 32 and 33 are connected with wheels 321 and 331, respectively. The magnet 4 is mounted to the rear wheel 331.

To assemble the present invention, place the control box 1 on the rear leg 33 by engaging the pin 11 with the rear leg 33, thus when pushing the carriage, the magnet 4 mounted on the rear wheel 331 rotates simultaneously. When the magnet 4 reaches to the magnetic switch 5 and activates the magnetic switch 5 to form an open circuit. A prearranged signal is transmitted out at this moment to the IC 21 of the circuit 2 which then activates the speaker 24. A continuous activation of the magnetic switch 5 drives the speaker 24 to broadcast different rhythms. It is to be noticed that after the IC 21 is activated to output a rhythm through the speaker 24, even though the magnet 4 continues to activate the magnetic switch 5, the music will still play its music without being disturbed. If it is desired to stop the music, simply press the main switch 22 on the control box 1 to deactivate the control circuit 2 which will stop the music even through the magnetic switch 5 is still in an open status.

The other effect of the present invention is to mount with an illuminating diode so that the control circuit will provide both sound and the light effects.

The present invention may be incorporated with a transmitter which can not only create sound and light effects but also output a signal.

I claim:

1. A baby carriage with a combined sound and illumination system comprising:

a frame having a plurality of wheels for interfacing with a base surface;

a control box housing fixedly secured to said frame;

audio and illumination means coupled to said control box housing for producing an audio signal and an illumination signal;

a control circuit for activating and deactivating said audio and illumination means;

a magnet fixedly secured to the interior of one of the said wheels;

a magnetic switch fixedly positioned on a leg of said frame, said magnetic switch and said control circuit electrically coupled by a lead wire;

wherein rotation of said magnet activates said magnetic switch, allowing an activation signal to be sent to said control circuit through said lead wire, for the activation of said audio and illumination means.

2. The baby carriage as recited in claim 1 including a coupling pipe mounted on said frame adjacent at least one of said wheels having said magnet fixedly secured thereto.

3. The baby carriage as recited in claim 2 where said frame includes at least one leg member having a portion thereof positioned adjacent said wheel having said magnet fixedly secured thereto.

4. The baby carriage as recited in claim 3 where said control box is fixedly secured to one of said frame leg members.

* * * * *